(12) United States Patent
Vecchiarino et al.

(10) Patent No.: US 6,368,093 B1
(45) Date of Patent: *Apr. 9, 2002

(54) APPARATUS FOR MANUFACTURING COINJECTED PANELS

(75) Inventors: Luigi Vecchiarino, Vaprio D'Adda; Dante Siano, Cologno Monzese, both of (IT)

(73) Assignee: Johnson Control, S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,410

(22) Filed: Jun. 10, 1998

Related U.S. Application Data

(63) Continuation of application No. 08/168,535, filed on Dec. 16, 1993, now Pat. No. 5,799,385, which is a continuation-in-part of application No. 07/971,290, filed on Nov. 4, 1992, now abandoned.

(30) Foreign Application Priority Data

Dec. 10, 1991 (IT) .......................................... MI91A3301

(51) Int. Cl.⁷ .......................... B29C 35/00; B29C 31/10
(52) U.S. Cl. ...................... 425/130; 425/143; 425/144; 425/573
(58) Field of Search ................................ 425/130, 143, 425/144, 548, 549, 573; 264/241, 255, 513

(56) References Cited

U.S. PATENT DOCUMENTS

| | | | | |
|---|---|---|---|---|
| 4,104,353 A | | 8/1978 | Monnet | 264/255 |
| 4,808,101 A | * | 2/1989 | Schad et al. | 425/130 |
| 5,030,076 A | * | 7/1991 | Ebenhofer et al. | 425/130 |
| 5,054,689 A | * | 10/1991 | Hunerberg et al. | 264/572 |
| 5,093,053 A | * | 3/1992 | Eckardt et al. | 264/572 |
| 5,167,896 A | * | 12/1992 | Hirota et al. | 264/255 |
| 5,223,275 A | * | 6/1993 | Gellert | 425/130 |
| 5,232,710 A | * | 8/1993 | Miyazawa et al. | 425/130 |
| 5,788,906 A | * | 8/1998 | Morita | 264/245 |

FOREIGN PATENT DOCUMENTS

| | | |
|---|---|---|
| DE | A-1929363 | 12/1970 |
| DE | A-2129348 | 1/1975 |
| FR | 2045946 | 5/1971 |

OTHER PUBLICATIONS

Handbuch "SpritzgieBen—Auf Kurs in die 90er Jahre", Battenfeld GmbH.

Prospekt "SpritzgieBtechnik 1987/88" der Battenfeld GmbH.

Drawing of a s–K–heiBkanalverteiler, drawing–No. SF.O–4515/9214.

Drawing of a 2–K heiBkanalverteiler, article No. SE 4515B21.

* cited by examiner

*Primary Examiner*—Suzanne E. McDowell
(74) *Attorney, Agent, or Firm*—Lerner, David, Littenberg, Krumholz & Mentlik, LLP

(57) ABSTRACT

Trim panels for motorvehicles are manufactured by: injection molding a panel base portion having missing parts of predetermined area and shape, said molding involving the coinjection of a surface material and of an inner core material; separately producing a plurality of portions of panel having area and shape substantially corresponding to the missing parts and fastening said separately produced portions to said panels.

9 Claims, 5 Drawing Sheets

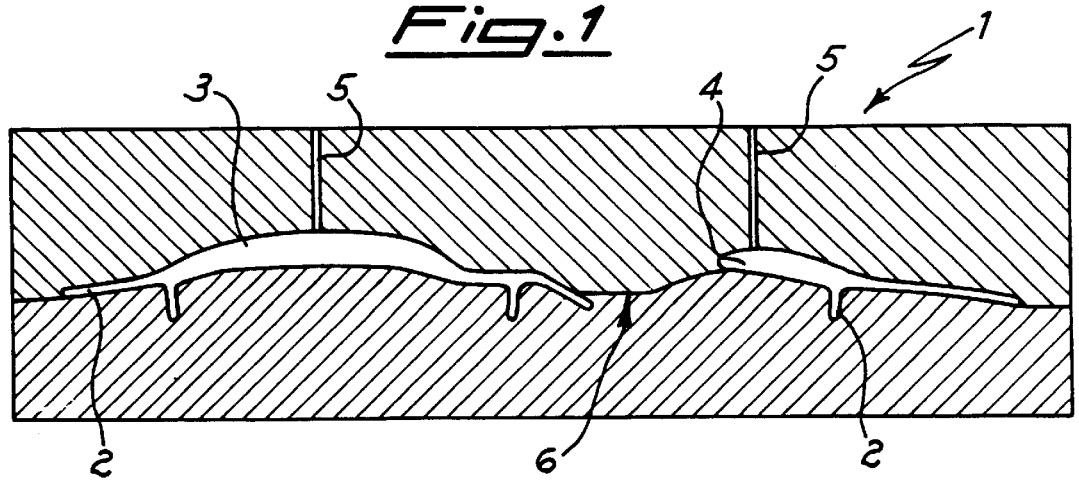
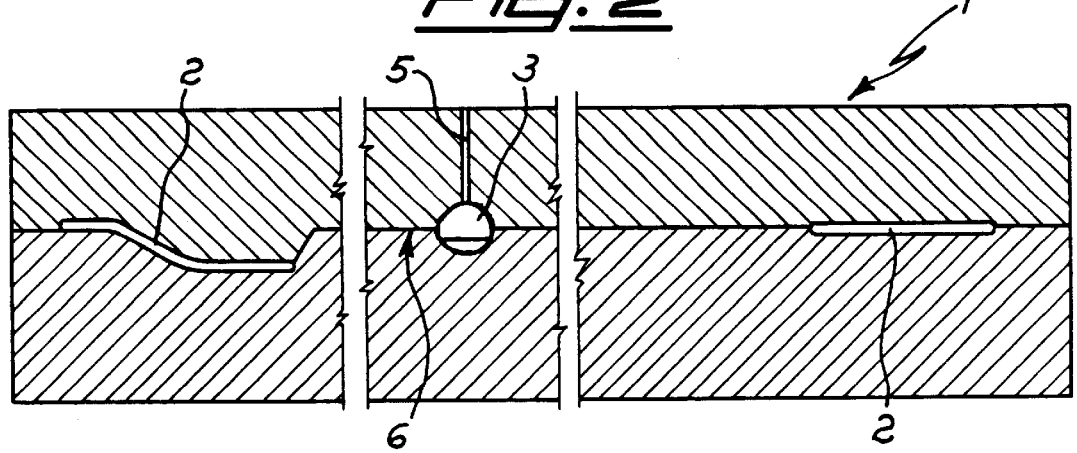
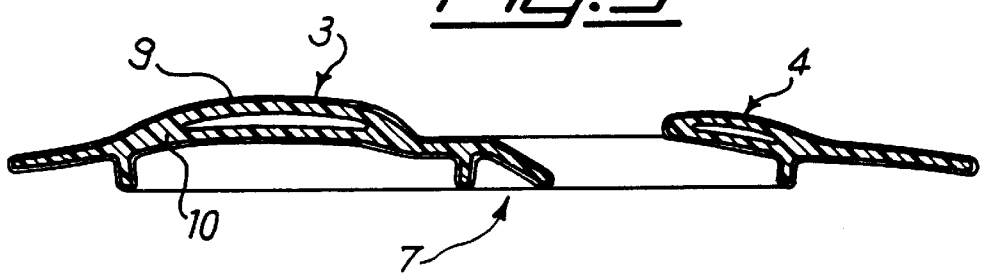

APPARATUS FOR MANUFACTURING COINJECTED PANELS

CROSS REFERENCE TO RELATED APPLICATIONS

This is a continuation of U.S. application Ser. No. 08/168,535, filed on Dec. 16, 1993, now U.S. Pat. No. 5,799,385, which is a continuation-in-part of U.S. application Ser. No. 07/971,290 filed on Nov. 4, 1992 now abandoned.

BACKGROUND OF THE INVENTION

1. Field of the Invention

The present invention relates to a process for manufacturing trim panels for motorvehicles and to the panels thus obtained.

Many types of processes are known for the manufacture of trim panels for interiors of motorvehicles. Generally, said processes envisage to produce first of all the base portion of the panel and then to apply additional elements thereon such as door handles and pockets, that are separately prepared.

Furthermore, methods are known envisaging to directly obtain a base portion without handle and pocket, but already provided with areas covered with a fabric to improve the general appearance of the panel. Said solution, which allows to avoid the subsequent application of additional small panels covered with fabric, has been described, with different features, in several patent applications in the name of the present applicant.

EP-A-0290399 (FIAT AUTO SpA) discloses a trim panel that is obtained by securing to a base panel having missing portions a plurality of complementary panels separately prepared, a pocket and a handle. The base panel is obtained by injection molding of a single plastic material.

U.S. Pat. No. 5,167,896 (Hirota) discloses the coinjection of a resin surface material and a core of fiber-reinforced resin mixture to manufacture a cabinet for use with a display. Only a portion of the obtained cabinet has a sandwich structure with inner core and two external layers. In fact, coinjection is not an easy process and it becomes even more difficult to control where the required molded article has a geometrically complex shape such as that of a trim panel.

2. Objects of the Invention

The object of the present invention is to propose a trim panel that can be manufactured with a reduced number of operations and therefore with reduced manufacturing costs. A further object is to provide a process of preparing such panel.

SUMMARY OF THE INVENTION

Said objects are obtained by means of the present invention that relates to a process of preparing a trim panel provided with a sandwich-type structure, comprising the following steps:

injection molding a first panel base portion that is one-piece with handle and/or pocket or similar undercut parts and has missing portions located at least in correspondence to said handle or pocket or undercut parts of the panel, by coinjecting an external surface material and an inner core material into a mold provided with a cavity corresponding to said first base portion, said coinjection molding being carried out by separately heating and plasticizing the external surface material and the inner core material, feeding said materials to separate feeding ducts, independently heated, extending into the wall of said mold, feeding said materials through said ducts to one or several injection nozzles positioned inside the said mold wall, adjacent to or spaced from the said cavity of the mold, and simultaneously or successively injecting said surface material and inner core material in a fluid state into said cavity to form a sandwich-type panel base portion;

separately preparing one or more complementary panel portions having area and shape substantially corresponding to those of said missing base portions; and fastening said complementary panel portions to said first panel.

According to a preferred embodiment, two or more injection nozzles are used and the mold is locally heated to maintain the injected materials in a fluid condition until they meet inside the mold cavity and form a single panel. The invention also relates to a trim panel for autovehicles comprising a first panel base portion provided with missing portions located in correspondence of at least a handle or a pocket that are in one-piece with said first base portion, and one or more complementary panel portions separately produced and bound to said first panel base portion in correspondence to cited missing portions of the panel; said first panel base portion being essentially consisting of two external layers of surface material and of an inner layer of core material arranged in a sandwich arrangement, said surface material and said core material being coinjected in a mold through one or several injection nozzles to obtain said first panel base portion.

According to a preferred aspect of the invention, said missing portions of the first panel base portion obtained by co-injection molding are located in correspondence to the areas where, in the finished panel, there is provided an undercut, namely in correspondence to the door handle and the panel pocket. During the molding step a gas injection may be performed in correspondence to localized areas of the panel such as for instance handle, pocket, ribs or other areas where shrinkage may occurr.

The missing portions of the panel are manufactured separately, in a known way, and are preferably consisting of small panels covered with fabric.

The invention will be now described in a more detailed way with reference to the accompanying drawings given by illustrative and non limiting purposes, where:

BRIEF DESCRIPTION OF THE DRAWINGS

FIG. 1 is a side sectional view of a mold to be used in the process according to the invention;

FIG. 2 is a partial view of the transverse section of the mold of FIG. 1;

FIG. 3 is a side sectional view of a partially formed panel;

DESCRIPTION OF THE PREFERRED EMBODIMENTS

It is hereby specified that the term "trim panel" and "panel for interiors" as herein used means, besides the panels for doors, any type of element for motorvehicles internal trimming such as dashboard, heel-posts, hat shelves, and so on.

The term "conjection", as here used, refers to an injection-molding process wherein two different materials are injected into the same mold cavity, independently on the fact that they are injected simultaneously or successively.

FIG. 1 shows in side section a mold suitable to be used for the process according to the invention, and reference thereto will be initially made to describe said process. As previously mentioned, the process according to the invention envisages first of all to form in the mold 1 a partial structure of panel by injection molding a material for the external surface, i.e. the so called imitation leather of the panel, and a material for the inner support that is preferably consisting of polypropylene with sawdust filler; these materials are known in the art and are commercially available.

Preferably the material of external coating, too, is polypropylene. By having the same kind of inner and outer material, recycling of the panel once the car is disposed of, will be much easier. Examples of materials suitable to be used are the products EXP 1638/3 for the internal portion and EXP 1/162 for the external one, both produced by HIMONT.

During the injection of said materials into the cavities 2 of the mold 1, a gas may be injected at predetermined locations of the panel. In particular said gas injection is performed in correspondence to the door handle 3 and the panel pocket 4 and in all points such as ribs or the like where the injected material is subject to volume variations upon cooling, that may result in shrinkage cavities.

Figure 4:
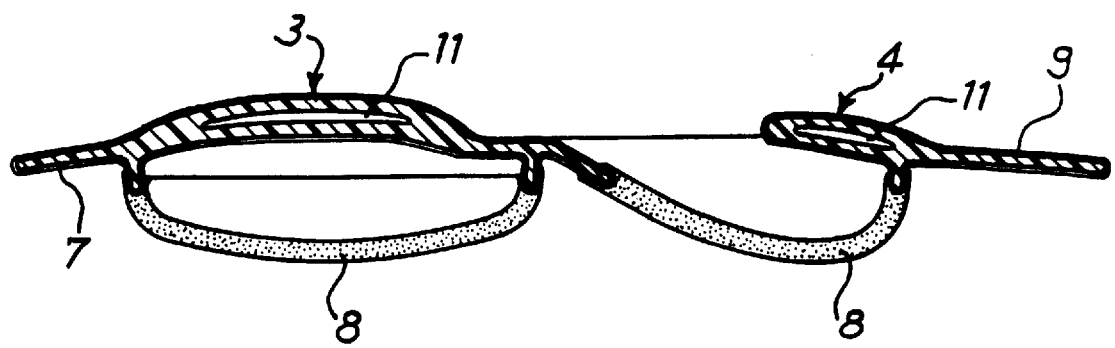
FIG. 4 is a side sectional view of a finished panel.
Figure 6:
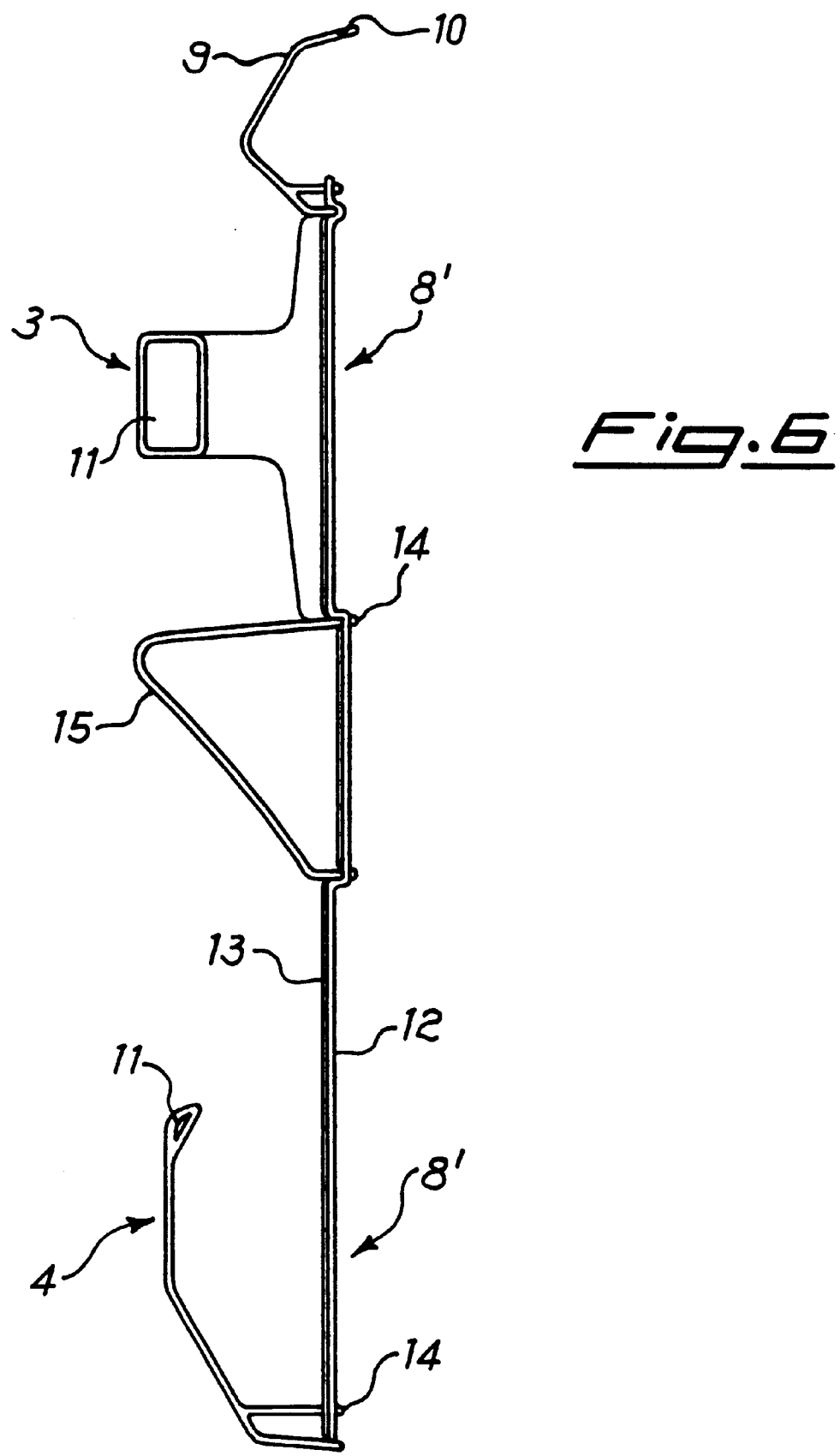
FIG. 6 is a side sectional view of a further embodiment of a panel according to the invention.

Such gas injection results in empty spaces 11 within the material 10, as disclosed in FIGS. 3, 4 and 6. FIGS. 1 and 2, for better clarity of the drawing, schematically represent only channels 5 for gas injection in correspondence to handle and pocket, while channels for thermoplastic injection are not disclosed.

As better shown in FIG. 2, the mold 1 presents, on the half-molds, surfaces 6 which are in contact with each other in order to obtain the required missing areas of the base panel portion. These surfaces are located at least in correspondence to the areas that in the finished panel will be undercut areas, namely at least in correspondence to the door handle 3 and the pocket 4 and in any case where a decorative element is required.

Thus an incomplete panel is obtained, where its base portion, corresponding to cavities 2 is one piece with the handle and the pocket, and which is provided with a plurality of missing base portions at least in correspondence thereto. The missing base portions have predetermined area and shape, because they have both a technical function, namely to allow the formation of undercut areas (i.e. handle and/or pocket) and a decorative function, namely to form fabric covered areas. FIG. 3 shows a side section of the thus obtained panel semi-finished product, where the covering sheet 9 and the sawdust filled core material 10 are disclosed.

As is apparent from this drawing, the panel portion obtained by co-injection molding is provided with the covering sheet 9 that extends on both sides of semi-rigid internal material 10 in a "sandwich" type arrangement. A laminated panel having an inner core of semi-rigid material and two external layers of covering material is thus obtained.

This panel base portion is new and has many advantages with respect to prior art panels. In fact, it has greater rigidity with respect to known panel portions such as that disclosed in European application n. 0290399 (FIAT AUTO) or with respect to traditional panels that generally require stiffening elements on their back.

Another advantage resides in that the double covering layer of plastic material, e.g. polypropylene, on the front side is shaped according to an imitation leather pattern directly during the moulding step.

A further advantage is that the back side of the double external covering acts as a waterproof sheet protecting the filler-containing core from water and moisture. In prior art embodiments it was necessary to apply a waterproof sheet on the back side of the panel.

A still further advantage is that no finishing process for the panel edges is required. According to prior art, the panel was die-cut along its periphery and, in order to obtain a good appearance of the panel, the cut edges were bended and bond to the back side of the panel. According to the present application this operation is no more required, because it is possible to obtain the required outline and shape of the panel edges directly in the molding step.

The missing portions of panel are produced separately, and generally consist of panels 8 preferably consisting of or covered with a material different from the one used for the external coating of the semi-finished product 7. Said panels 8 will have area and shape complementary and substantially corresponding to those of the portions missing on the semi-finished product 7. The term "substantially corresponding" means that panels 8 are provided with flanges or edges allowing their fastening to the semi-finished product 7 for the panel completion. All complementary panels 8 for one semi-finished product 7 may be obtained in a single piece panel 8 (FIG. 6).

Preferably, complementary panels 8 will be of the type covered with fabric and will therefore constitute the fabric areas that in the known technique are generally obtained in a single piece with the imitation leather coating.

The panel base portion is obtained by coinjection of surface material 9 and core material 10. In order to obtain the required panel base portion, integral with handle, pocket etc, the invention provides the coinjection of the two materials at one or more injection points on the mold, through injection nozzles that are located within the walls of the mold. In order to obtain substantially homogeneous distribution of surface and core materials in a suitable ratio, the surface and core materials are first separately heated and plasticized by two separate plasticators each operated at the plasticizing temperature that is optimal for the relevant material. The plasticized materials are then separately fed at the coinjection units.

Figure 7:
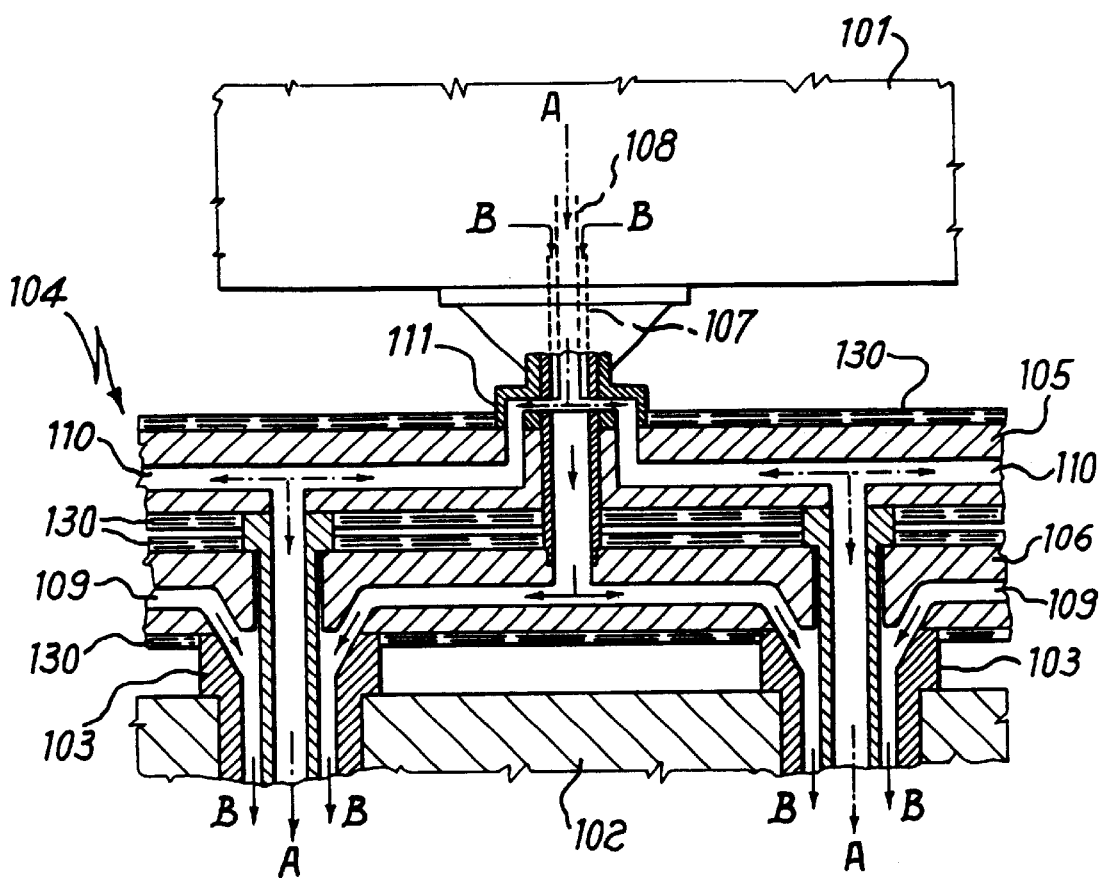
FIGS. 7 and 9 are sectional and partial view of coinjection devices for carrying out the invention injection molding step.

This is obtained by means of injection apparatuses such as the preferred embodiment disclosed in FIGS. 7 to 10. FIG. 7 shows a device 104 for the coinjection of two materials A, B, upstream connected with an injection moulding machine 101 or other similar equipment capable of downstream delivering said materials at suitable pressure and temperature to a mold 102 through coinjection units 103.

The device 104 comprises two distinct plates 105 and 106, independently heated by heating means 130 to control their temperature, provided between feeding ducts 107 and 108 for the materials at the fluid state coming from the injection moulding machine 101, and ducts 109 and 110 for the distribution of the same materials to a plurality of coinjection units 103 housed in the mold 102.

In the embodiment as shown in FIG. 7, the feeding ducts 107, 108, are coaxial and arranged one inside the other. In correspondence to a fitting 111, the ducts are separated in such a way that each one follows its own path in the relevant plate, in order to allow an independent temperature control of each material.

The heating and the temperature control of the plates is carried out by known means, for instance using resistors 130 and thermocouples (not shown) housed in the plates themselves. Thermal insulation means could be provided to have a better temperature control.

To illustrate more clearly the paths of materials inside the device, the path of material A is indicated by dashed-dotted arrows, while path of material B is indicated by continuous line arrows.

The ratio of surface and core materials is selected in view of their properties and of the required final characteristics of the panel. The amount, in volume, of core material is within the range from 40% to 80% of the total volume of injected materials.

In correspondence to the injection points provided on the mold 102, the ducts 109, 110 are again brought to the coaxial arrangement corresponding to that of feeding ducts 107, 108, to allow their connection with the coinjection units 103. Units 103 comprise two coaxial injectors separately operatable to allow the regulation of the mass flow rate of the injected materials.

Figure 8:
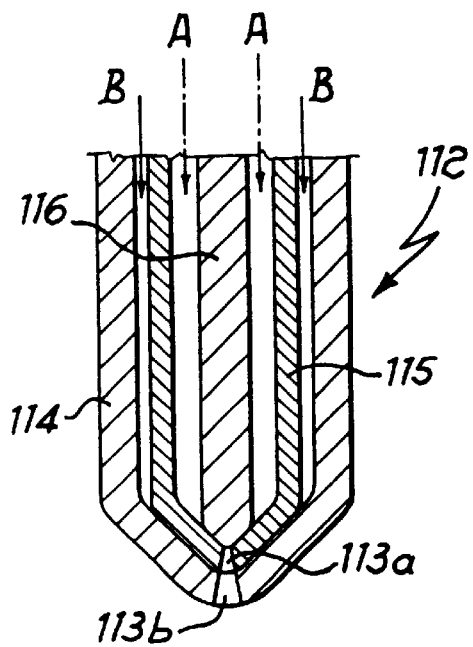
FIGS. 8 and 10 are schematical sectional views of preferred coinjection nozzles.

FIG. 8 schematically shows in cross-section the lower portion of an injector 112, namely the one provided in correspondence to a hollow portion of the mold 102, in the position of non delivery of both materials A and B from the relevant nozzles 113a and 113b.

To perform the delivery of material A, the shutter 116 is lifted with respect to the body 115 of the internal injector, thus freeing the injection port of the nozzle 113a. The delivery of material B, on the contrary, takes place by lifting the body 115 of the internal injector, also acting as a shutter of the injection port of the nozzle 113b, with respect to the body 114 of the external injector. It is moreover possible to obtain a combination of movements allowing a simultaneous delivery of both materials.

Figure 9:
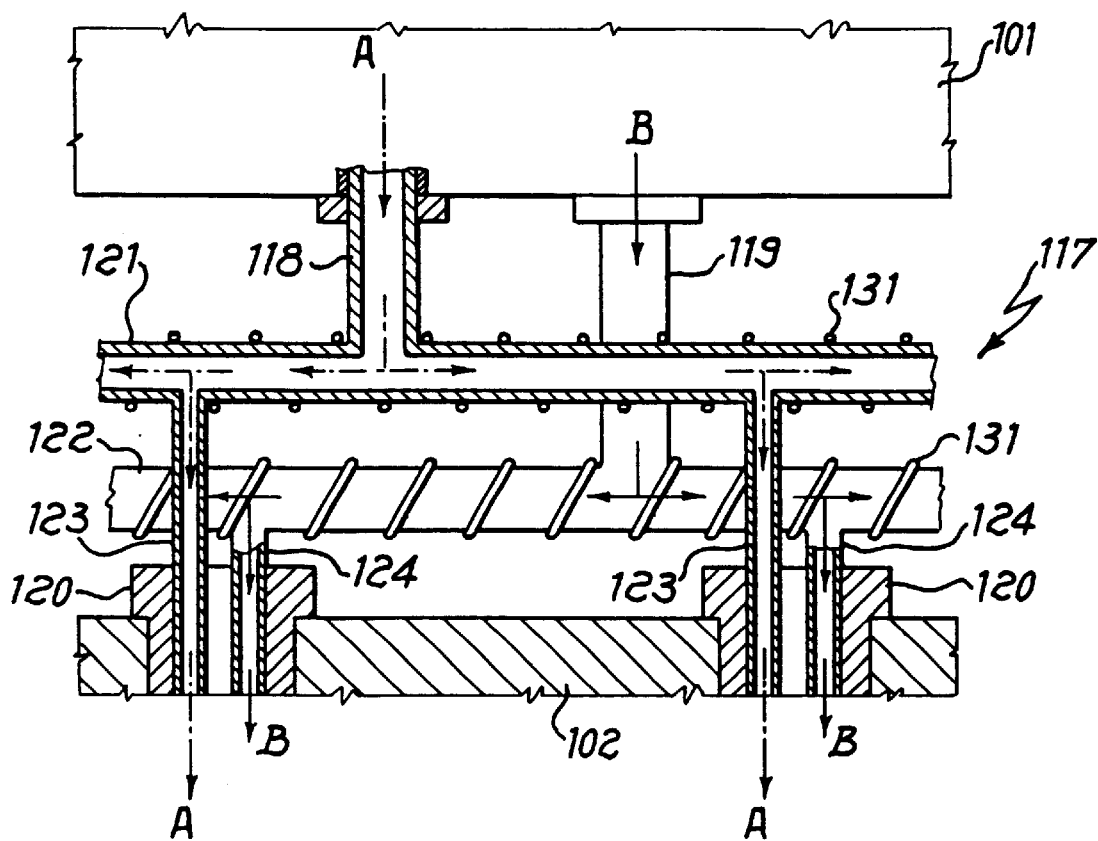

FIG. 9 shows a further embodiment of a device 117 for the coinjection in several injection sites of a mold.

According to the present invention the device 117 is upstream connected to injection moulding machine 101 through two distinct tubular ducts 118 and 119 for feeding materials A and B respectively, while downstream it is connected to a mold in correspondence to a plurality of coinjection units 120.

The device 117 comprises two distinct tubular ducts 121 and 122, independently heated by heating means 131a, 131b that also act as means to control their temperature. Ducts 118 and 119 are connected to feeding ducts 118 and 119 and feed the heated materials at the fluid state coming from injection moulding machine 101 to ducts 123 and 124 for the distribution of the same materials to each of the coinjection units 120 housed in the mold 102.

In this case, too, the tubular ducts 121 and 122 are separated, in order to allow a separate heating and temperature control of the materials that are flowing therein; also the heating and temperature control are performed by known means, for example by using electrical resistors 131a and 131b and thermocouples (not shown) placed directly in contact with the ducts 121, 122.

From each duct 121 and 122 many ducts are derived, 123 and 124 respectively, that reach the single injection units 20 provided on the mold 2.

The coinjection units 120 provided in the embodiment of FIG. 9 preferably comprise two injectors placed side by side and separately operable, to allow an independent regulation of the mass flow rate of injected materials; it is understood that in this case, too, coaxial injectors can be used, as previously described, envisaging suitable connecting adapters between the ducts 123, 124 and the coinjection units 120.

Figure 10:
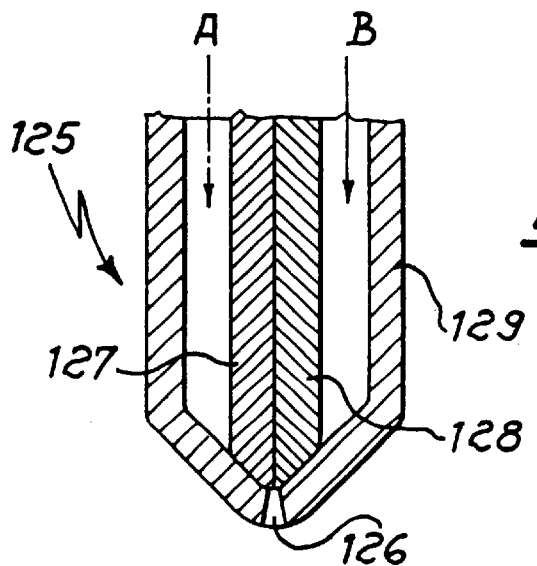

FIG. 10 schematically shows in cross section the lower portion of an injector 125, namely that portion provided in correspondence to a hollow portion of the mold 102, in the condition of non delivery of both materials A and B from the nozzle 126.

To perform the delivery of material A a shutter 127 is lifted from the injector body 129, thus freeing a portion of the injection port of nozzle 26. The delivery of material B, on the contrary, takes place by lifting a shutter 128 of the corresponding portion of the injection port of nozzle 126 from the injector body 129. It is also possible to carry-out a combination of movements that allow the simultaneous delivery of both materials.

Alternatively, the injection unit of FIG. 10 can have two separated nozzles (instead of the nozzle 26 alone) placed side by side and each obstructed by related shutters 127 and 128.

Preferably, the injectors 112 and 125 comprise means for the heating and the independent temperature control of each flow of material.

According to a further feature of the present invention, the device also comprises means for a localized heating of a plurality of areas of the mold 102, for example in order to improve a homogeneous distribution of materials to particular areas of the mold or to avoid undesirable cooling in correspondence to conjunction zones between the flows of the materials coming from different injection points. Similary, cooling means (know in the art and comprising e.g. water ducts) can be provided at those mold location such as the handle, where the amount of injected material is such as to require a too long cooling time in standard conditions.

Coinjection may be carried out in only one point or in several points.

By performing the coinjection in more points by means of the device of the present invention, it is easier to obtain an even distribution of surface material in all areas of the mold, even in the case where the mold is structurally complex or superficially very wide. The number and positions of injection points are chosen according the geometry of the panel base portions in order to have a corresponding number of injection volumes within the cavity of the mold, substantially equal to each other.

Most preferably, at least one injection nozzle will be located in correspondence or adjacent to the most "difficult" (i.e. geometrically complex) areas of the mold, such as the handle or pocket or, e.g. a housing for autovehicle stereo speakers.

The techniques of localized gas injection during the injection of a thermoplastic material are known in the art (see e.g. U.S. Pat. Nos. 5,162,092 and 4,923,666), as well as the molding of panels coated with fabric. For example, these latter can be obtained by the injection molding of a thermoplastic support on a coating fabric, as described in European Patent Applications 92101529.3 and 93830051.4 filed by the Applicant on Feb. 1, 1991, and on Feb. 12, 1993, both herein enclosed by reference.

Figure 5:
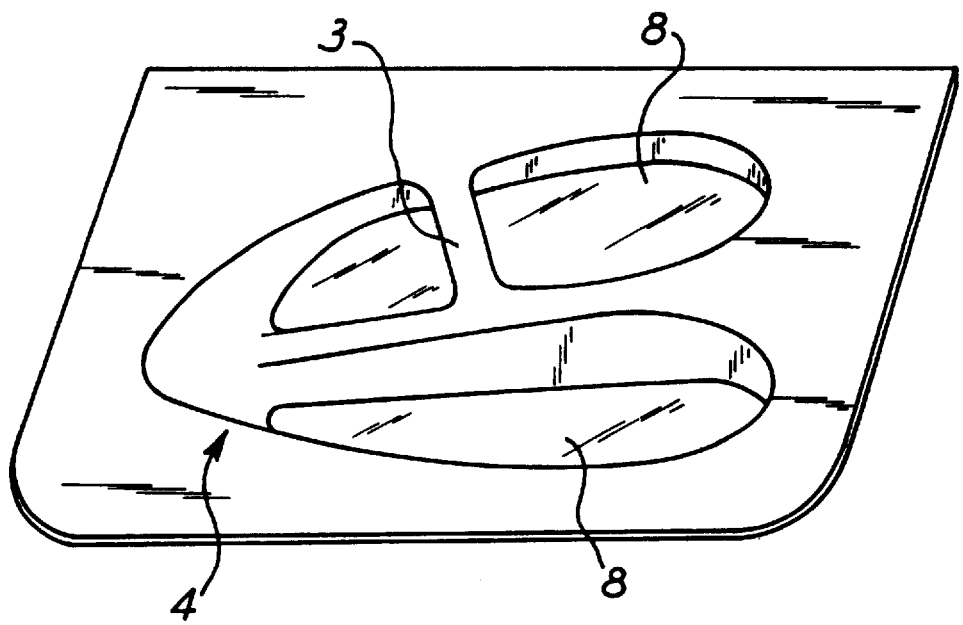
FIG. 5 is a perspective view of the panel of FIG. 4.

After fastening complementary panels 8 to the semi-finished product 7, the finished panel schematically shown in FIGS. 4, 5 and 6 is obtained.

FIG. 6 discloses a further embodiment of a trim panel according to the invention. In this embodiment, besides pocket 4 and handle 11, there is also an armrest 15. In this case missing base portions are obtained from a single complementary panel 8' consisting of a supporting element 12 and a cover element, e.g. made of fabric, 13, provided on the front face of panel 8'. Complementary panel 8' is secured to semi-finished panel 7 by securing means 14 such as screws at any suitable means known in the art.

The economical and esthetic advantages of the process according to the invention are evident. In fact, it is possible to obtain door handles and pockets in a single piece with the panel, thus avoiding their separate production and their subsequent fastening to the panel by means of screws. Furthermore, the separate manufacture of one or several panels 8 allows to obtain in the finished panel the so-called "shadow effect", usually given by the presence of a fabric panel separate from the bottom panel, otherwise very hardly obtainable.

What is claimed is:

1. An apparatus for feeding fluid material into a mold having at least one cavity defined by walls, said apparatus comprising:
    a plurality of ducts for receiving fluid materials;
    a plurality of heating devices operatively connected to said plurality of ducts for independently heating said ducts and the fluid material therein;
    a plurality of coinjection units arranged to receive the fluid material from corresponding ones of said plurality of ducts, and to coinject the separately heated fluid material into a single one of said at least one cavity of the mold, said coinjection units including a plurality of injectors; and
    a plurality of heat regulation devices arranged to independently regulate heat applied to each of said injectors.

2. The apparatus of claim 1 wherein said plurality of coinjection units are arranged at least partially within the walls of the mold.

3. The apparatus of claim 1 wherein said plurality of coinjection units comprise regulation means for independently regulating the flow rate of the fluid material.

4. The apparatus of claim 1 wherein said plurality of heating devices are arranged in direct contact with corresponding ones of said plurality of ducts.

5. The apparatus of claim 1 wherein said plurality of coinjection units comprise two coaxial injectors.

6. The apparatus of claim 1 wherein said plurality of coinjection units comprise two separate injectors.

7. The apparatus of claim 1 further comprising additional heating means for locally heating selected portions of the associated mold.

8. The apparatus of claim 1 further comprising means for injecting gas at selected locations within said mold.

9. An apparatus for feeding fluid material into a mold having at least one cavity defined by walls, said apparatus comprising:
    a plurality of ducts for receiving fluid material;
    a plurality of heating devices operatively connected to said plurality of ducts for independently heating said ducts and the fluid material therein;
    a plurality of coinjection units arranged to receive the fluid material from corresponding ones of said plurality of ducts, and to coinject the separately heated fluid material into a single one of said at least one cavity of the mold, said coinjection units including a plurality of injectors; and
    a plurality of flow regulation devices arranged to independently regulate fluid material flow within said injectors.

* * * * *